United States Patent [19]
Loaiza

[11] Patent Number: 5,809,495
[45] Date of Patent: Sep. 15, 1998

[54] METHOD FOR OBTAINING INFORMATION REGARDING THE CURRENT ACTIVITY OF A DATABASE MANAGEMENT SYSTEM FROM A VIRITUAL TABLE IN A MEMORY OF THE DATABASE MANAGEMENT SYSTEM

[75] Inventor: Juan R. Loaiza, San Carlos, Calif.

[73] Assignee: Oracle Corporation, Redwood Shores, Calif.

[21] Appl. No.: 658,059

[22] Filed: Jun. 4, 1996

[51] Int. Cl.⁶ .................................................. G06F 17/30
[52] U.S. Cl. ................................ 707/2; 707/10; 707/102
[58] Field of Search .................................... 707/2, 3, 4, 5, 707/10, 1, 102

[56] References Cited

U.S. PATENT DOCUMENTS

| | | | |
|---|---|---|---|
| 5,418,947 | 5/1995 | Hsu et al. | 707/1 |
| 5,452,450 | 9/1995 | Delory | 707/10 |
| 5,511,190 | 4/1996 | Sharma et al. | 707/1 |
| 5,555,388 | 9/1996 | Shaughnessy | 707/10 |
| 5,634,053 | 5/1997 | Noble et al. | 707/4 |
| 5,666,987 | 9/1997 | Schneider | 707/3 |

OTHER PUBLICATIONS

"Documentum Adds Web, Notes Interface: Accelera Web Browser and UnaLink Workgroup Software", Seybold Report on Publishing Systems, v25, n10, p. 33(1), Feb. 1996.

"Selecting End–User Data Access Tools", Herb Edelstein et al., Open System Today, n159, p. 48, Sep. 1994.

"Breaking All the Rules: An Insider's Guide to Practical Nommalization", Menninger, D., Data Based Advisor, v13, n1, p. 116(5), Jan. 1995.

*Primary Examiner*—Thomas G. Black
*Assistant Examiner*—Hosain T. Alam
*Attorney, Agent, or Firm*—Blakely, Sokoloff, Taylor & Zafman LLP

[57] ABSTRACT

A computer implemented method, involving a database management system, retrieves information from a data structure in a memory of a computer system. A user process specifies in a database query language statement a key value used to directly access the information, rather than sequentially searching the entire data structure for the information. A database management system process uses the value to find a location in the data structure at which said information is stored and maps the location in the data structure to a memory address in memory at which the information corresponding to the value is stored. The database management system process retrieves the information from the data structure in memory beginning at the memory address and provides the information to the user process in response to the database query language statement.

22 Claims, 7 Drawing Sheets

| SESSID | USERNAME | HASH TABLE IN MEMORY |
|---|---|---|
| 12 | | |
| 7 | | |
| 14 | | |
| 6 | | |
| 2 | | |
| 9 | | |
| 3 | | |
| 1 | | |
| 5 | | |
| 4 | | |
| 8 | | |
| 10 | | |
| 11 | | |
| 13 | | |

FIG. 7

METHOD FOR OBTAINING INFORMATION REGARDING THE CURRENT ACTIVITY OF A DATABASE MANAGEMENT SYSTEM FROM A VIRITUAL TABLE IN A MEMORY OF THE DATABASE MANAGEMENT SYSTEM

FIELD OF THE INVENTION

The present invention relates to a method and apparatus for accessing a virtual table in a database management system (DBMS).

BACKGROUND OF THE INVENTION

Database management system software is useful for solving the problems of information management. In general, a database management system (DBMS) should be able to reliably manage a large amount of data in a multi-user environment so that many users can concurrently access the same data.

Present database management systems, such as the Oracle Server database management system available from Oracle Corporation, Redwood City, Calif. 94065, generally adhere to an industry accepted standard for a data access language, e.g., the Structured Query Language (SQL). SQL is a standard database access language for relational database management systems. All operations on the information in a database management system using SQL are performed using SQL statements, which can be thought of as straightforward computer programs or instructions. SQL statements can be divided into a number of general categories, including but not limited to, data manipulation (DML) statements. DML statements are used to specify operations that manipulate data within a database. For example, querying, inserting, updating, and deleting rows of a table are all DML operations.

Traditionally, information regarding current database activity or system activity, including, for example, session information and user information, was available to the user of a database management system through the use of computer operating system (OS) commands or statements. However, the use of OS commands or statements to obtain such information required the user to understand and be familiar with the syntax of operating system commands and statements in addition to the SQL commands and statements used to obtain information from the database management system. Consequently, database systems have been developed that allow a user to use standard SQL commands and statements to access the same information previously accessed only by appropriate operating system commands and statements. This allowed the user to obtain any and all information necessary to maintain the database management system through the use of a single set of commands provided by a data access language such as SQL.

According to one approach, database management system software maintains a set of virtual tables that store information about current database activity, e.g., current sessions, locks, open cursors, etc. These tables, also referred to as dynamic performance tables, are not really tables, hence the term "virtual tables". Unlike conventional tables, which comprise a structural set of data stored on a static, permanent storage medium, the virtual tables exist only in the random access memory of a computer system on which the DBMS resides. Furthermore, whereas a table stores data in rows and columns on a permanent storage medium, a virtual table allows a user to access data in memory as if it were stored in rows and columns.

Virtual tables were heretofore accessed only in a sequential manner. For example, upon receipt of a query requesting information from a virtual table, the DBMS would sequentially scan the entire virtual table, beginning at the first row of the virtual table and proceeding through to the last row of the virtual table, regardless of whether the information being sought was actually obtained from a row other than the last row of the virtual table. The inefficiency of such a process is readily apparent for a large virtual table, e.g., a virtual table having thousands of rows. Thus, a method and apparatus for directly accessing information in a virtual table in memory is needed.

SUMMARY OF THE INVENTION

A method and apparatus for directly accessing information in a virtual table in a database management system is provided. According to one aspect of the invention, a user can query information from the virtual table (a data structure in a memory of a computer system on which the database management system operates). A user process accepts a database query language statement from a user, wherein the user specifies a value corresponding to the information desired. The user process communicates with a database management system (DBMS) process. The DBMS process uses the value specified in the query language statement as an index to find the location of a row in the data structure at which the information resides. The DBMS process then maps the location in the data structure to a memory address in memory at which the information corresponding to the specified value is stored. The DBMS process then reads the information from the data structure in memory beginning at the memory address, and provides the information to the user process in response to the query performed by the user.

BRIEF DESCRIPTION OF THE DRAWINGS

The present invention is illustrated by way of example and not by way of limitation in the figures of the accompanying drawings and in which like reference numerals refer to similar elements and in which.

DETAILED DESCRIPTION OF THE PREFERRED EMBODIMENT

A method and apparatus for accessing information in a virtual table in a database management system is described. In the following description, for purposes of explanation, numerous specific details are set forth in order to provide a thorough understanding of the present invention. It will be apparent, however, to one skilled in the art that the present invention may be practiced without these specific details. In other instances, well know structures and devices are shown in block diagram form in order to avoid unnecessarily obscuring the present invention.

HARDWARE OVERVIEW

Figure 1:
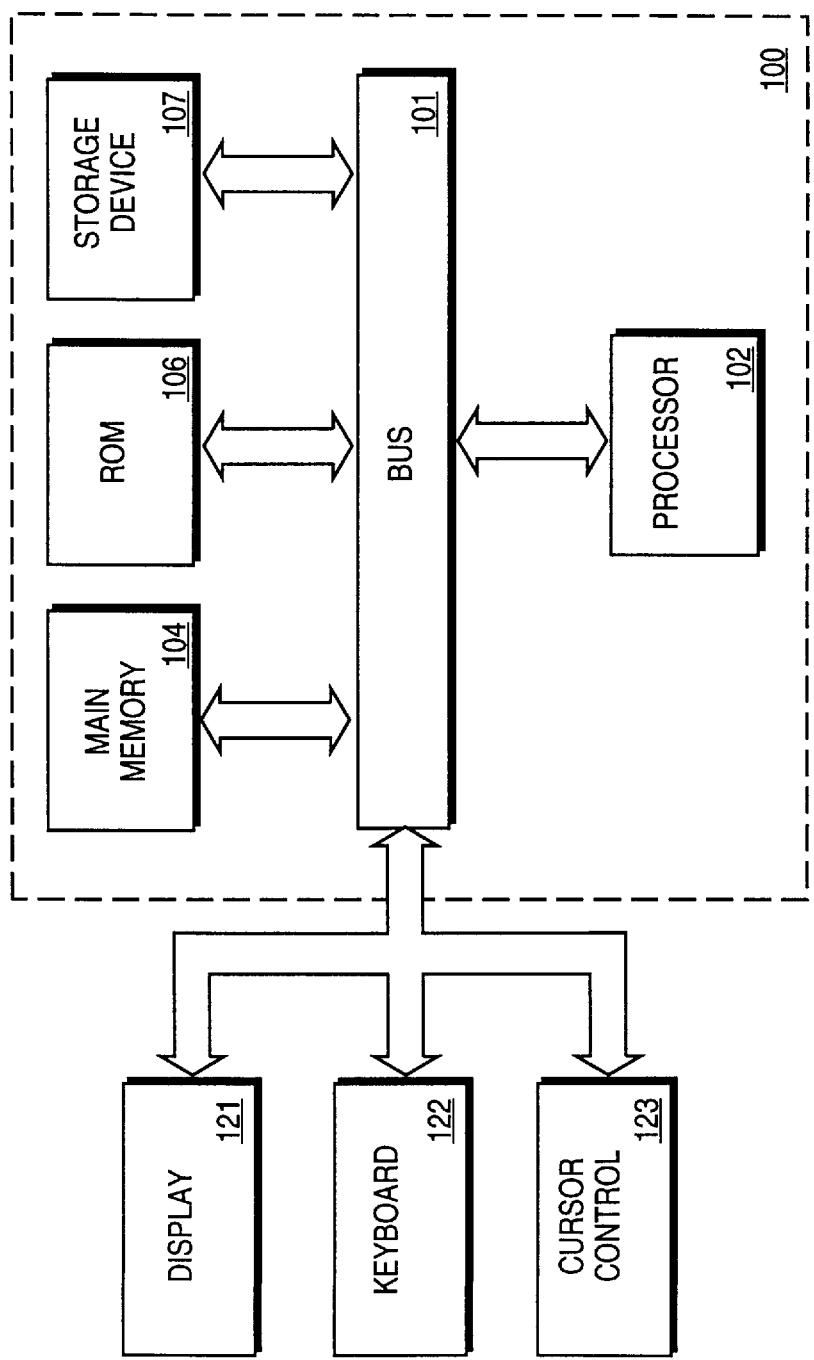
FIG. 1 illustrates a computer system on which the present invention may be implemented.

Referring to FIG. 1, the computer system upon which the preferred embodiment of the present invention can be implemented is shown as 100. Computer system 100 comprises a bus or other communication means 101 for communicating information, and a processing means 102 coupled with bus 101 for processing information. System 100 further comprises a random access memory (RAM) or other dynamic storage device 104 (referred to as main memory), coupled to bus 101 for storing information and instructions to be executed by processor 102. Main memory 104 also may be used for storing temporary variables or other intermediate information during execution of instructions by processor 102. Computer system 100 also comprises a read only memory (ROM) and/or other static storage device 106 coupled to bus 101 for storing static information and instructions for processor 102. Data storage device 107 is coupled to bus 101 for storing information and instructions.

A data storage device 107 such as a magnetic disk or optical disk and its corresponding disk drive can be coupled to computer system 100. Computer system 100 can also be coupled via bus 101 to a display device 121, such as a cathode ray tube (CRT), for displaying information to a computer user. An alphanumeric input device 122, including alphanumeric and other keys, is typically coupled to bus 101 for communicating information and command selections to processor 102. Another type of user input device is cursor control 123, such as a mouse, a trackball, or cursor direction keys for communicating direction information and command selections to processor 102 and for controlling cursor movement on display 121. This input device typically has two degrees of freedom in two axes, a first axis (e.g., x) and a second axis (e.g., y), which allows the device to specify positions in a plane.

Alternatively, other input devices such as a stylus or pen can be used to interact with the display. A displayed object on a computer screen can be selected by using a stylus or pen to touch the displayed object. The computer detects the selection by implementing a touch sensitive screen. Similarly, a light pen and a light sensitive screen can be used for selecting a displayed object. Such devices may thus detect selection position and the selection as a single operation instead of the "point and click," as in a system incorporating a mouse or trackball. Stylus and pen based input devices as well as touch and light sensitive screens are well known in the art. Such a system may also lack a keyboard such as 122 wherein all interface is provided via the stylus as a writing instrument (like a pen) and the written text is interpreted using optical character recognition (OCR) techniques.

In the currently preferred embodiment of the invention, computer system 100 is configured to execute a database application. Computer system 100 may be one of many computer systems accessing data stored in the same database, which may be centralized or distributed. Each of the computer systems may be executing one or more transactions.

The mechanisms of a database management system execute by using memory structures and processes. The memory structures exist in main memory 104 of computer system 100. It should be noted that in a distributed database management system, the memory structures may exist in the main memory of one or more computer systems that constitute the database management system. Processes are jobs or tasks performed by processors in response to executing sequences of instructions stored in the memory of the computer systems.

MEMORY USAGE

Database management systems create and use data structures in memory to complete many jobs. For example, data structures are used to store program code being executed and data that is shared among users. Several basic data structures are associated with the database management system, such as a shared memory region allocated by the DBMS that contains data and control information for one DBMS instance. With respect to FIG. 2, the shared memory region may be referred to as shared memory 200. Data is stored in data region 210 while control information, (i.e., information created, maintained and utilized by the various database management system processes for proper operation of the database management system) is stored in control information region 220, both of which are in shared memory region 200. The shared memory region 200 and DBMS processes, for example, DBMS processes 240 through 243, constitute a DBMS instance. The shared memory region 200 is allocated when a DBMS instance starts and is deallocated when the instance shuts down. The data in the shared memory region 200 is shared among the users currently accessing the database.

Figure 2:
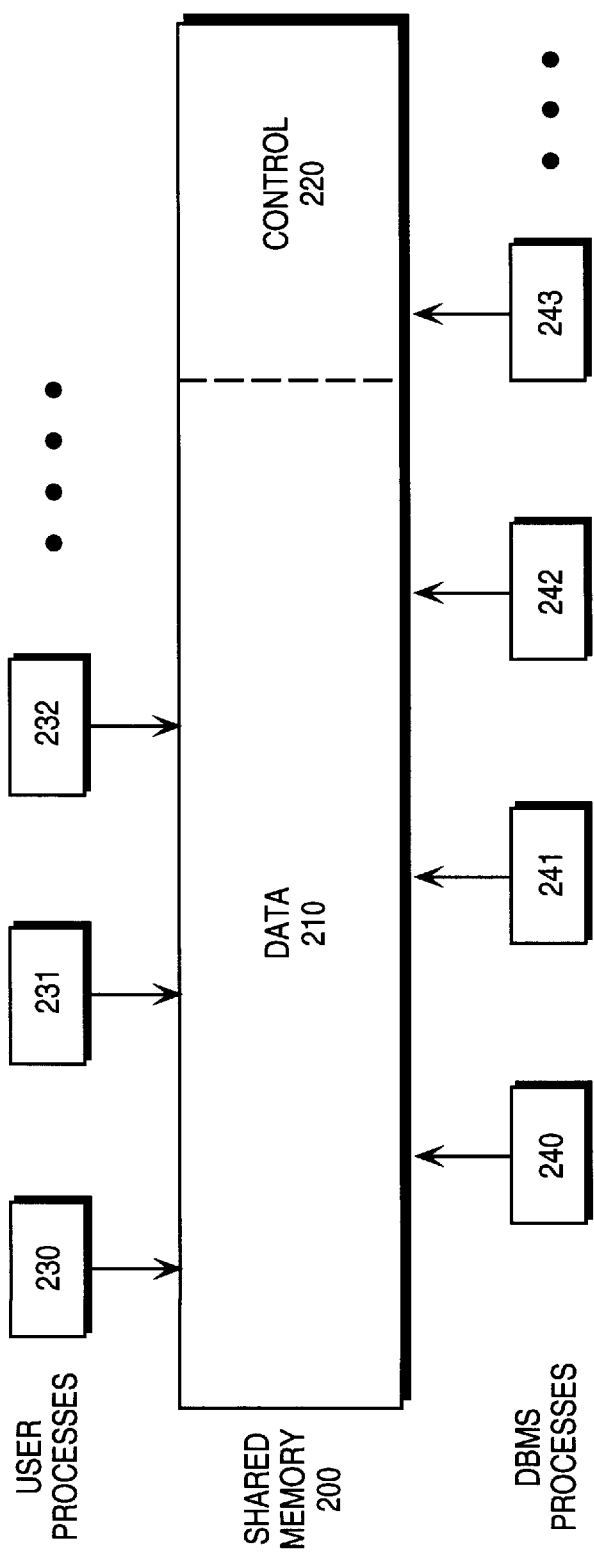
FIG. 2 illustrates the architecture of a database management system as may be embodied by the present invention.

A process normally has its own private memory area in which it runs. A typical database management system has two general types of processes: user processes and DBMS processes. A user process is created and maintained to execute the software code of an application program or a database management system tool such as SQL. The user process manages a user's communication with one or more server processes. User processes communicate with the server processes through a program interface. FIG. 2 illustrates user processes 230, 231, and 232 in a multi-user database management system environment.

The DBMS processes perform functions on behalf of the user processes. There are generally two types of DBMS processes: server processes and background processes. Server processes are created by the DBMS to handle requests from user processes. A server process communicates with a user process in conjunction with the database management system to carry out requests of the associated user process. For example, if a user queries for data in the database, the associated server process may read the proper data blocks from a data file on disk into the shared memory region 200. It should be noted that the user and server processes may be separate as shown, or they may be combined into a single process. Most database management systems create a set of background processes for each DBMS instance. The background processes consolidate functions that would otherwise be handled by multiple DBMS programs running for each user process. These processes may be implemented as threads on some systems.

DATA DICTIONARY

Within control information region 220 is a central set of read-only reference tables and views for a database, known collectively as a data dictionary. A data dictionary can provide, for example, information on the names of DBMS users on the system, the privileges and roles each user has been granted, auditing information, such as who has accessed or updated various objects, and other general database information. The data dictionary is structured in tables and views, just like other database data. A data access language, or query language, such as SQL, may be used to access data in the data dictionary. Because the data dictionary is read-only, users can only issue queries (e.g., SQL SELECT statements) against the tables and views of the data dictionary.

The data dictionary contains user accessible views that summarize and conveniently display the information in the tables of the dictionary. The views present the data in the tables as useful information, such as user or table names, and allow a user to specify SQL clauses to consolidate or simplify the information, such as the JOINS and WHERE clauses. The data dictionary has two primary uses: the DBMS accesses the data dictionary as necessary, e.g., upon the occurrence of certain statements issued by the user; and, any user can access the data dictionary as a read-only reference for information about the database.

Figure 3:
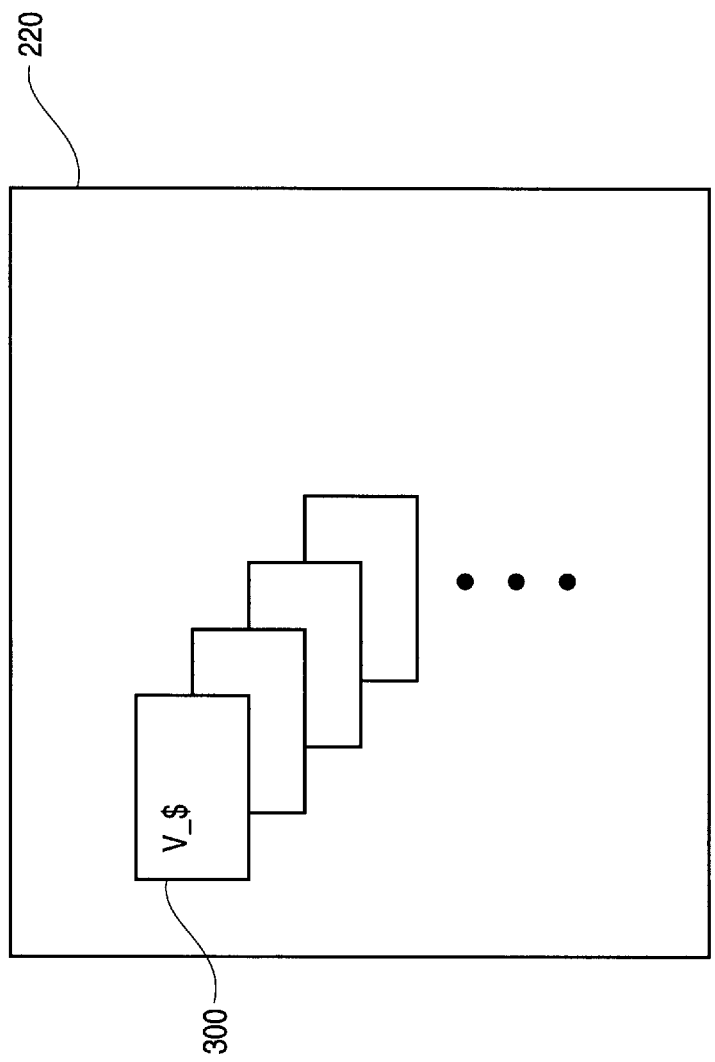
FIG. 3 illustrates the virtual tables accessed by an embodiment of the present invention.

Within the data dictionary, the DBMS maintains a set of virtual tables, distinct from the tables discussed above, to record current database activity. These virtual tables may be referred to as dynamic performance tables. Dynamic performance tables are not tables in the sense that no permanent storage space is allocated. As such, the virtual tables exist only in memory, e.g., random access memory 104. More specifically, with reference to FIG. 3, the virtual tables 300 are illustrated as existing within control information region 220 of the shared memory region 200.

INDEXES

An index is an optional structure associated with a table. The absence or presence of an index does not require a change in the wording of any statement used to access the table. An index is merely a fast access path to data in the associated table. Given a data value that has been indexed, an index points directly to the location of the row in a table containing that value. Indexes are logically and physically independent of the data in the associated table. They can be created or dropped any time without any effect on the table or other indexes. Indexes, as independent structures, do require separate storage space on disk or some other form of permanent storage medium. An index is created explicitly to speed statement execution on a table. Properly used, indexes are a primary means of reducing disk space I/O as may occur when accessing a table stored on disk.

Because virtual tables are maintained in memory and not stored in a permanent storage medium, an index cannot be associated with them. As will be seen, the present invention provides a method of non-sequentially accessing information in a virtual table notwithstanding the absence of a logically and physically separate index structure.

ACCESSING INFORMATION IN A VIRTUAL TABLE

Figure 4:
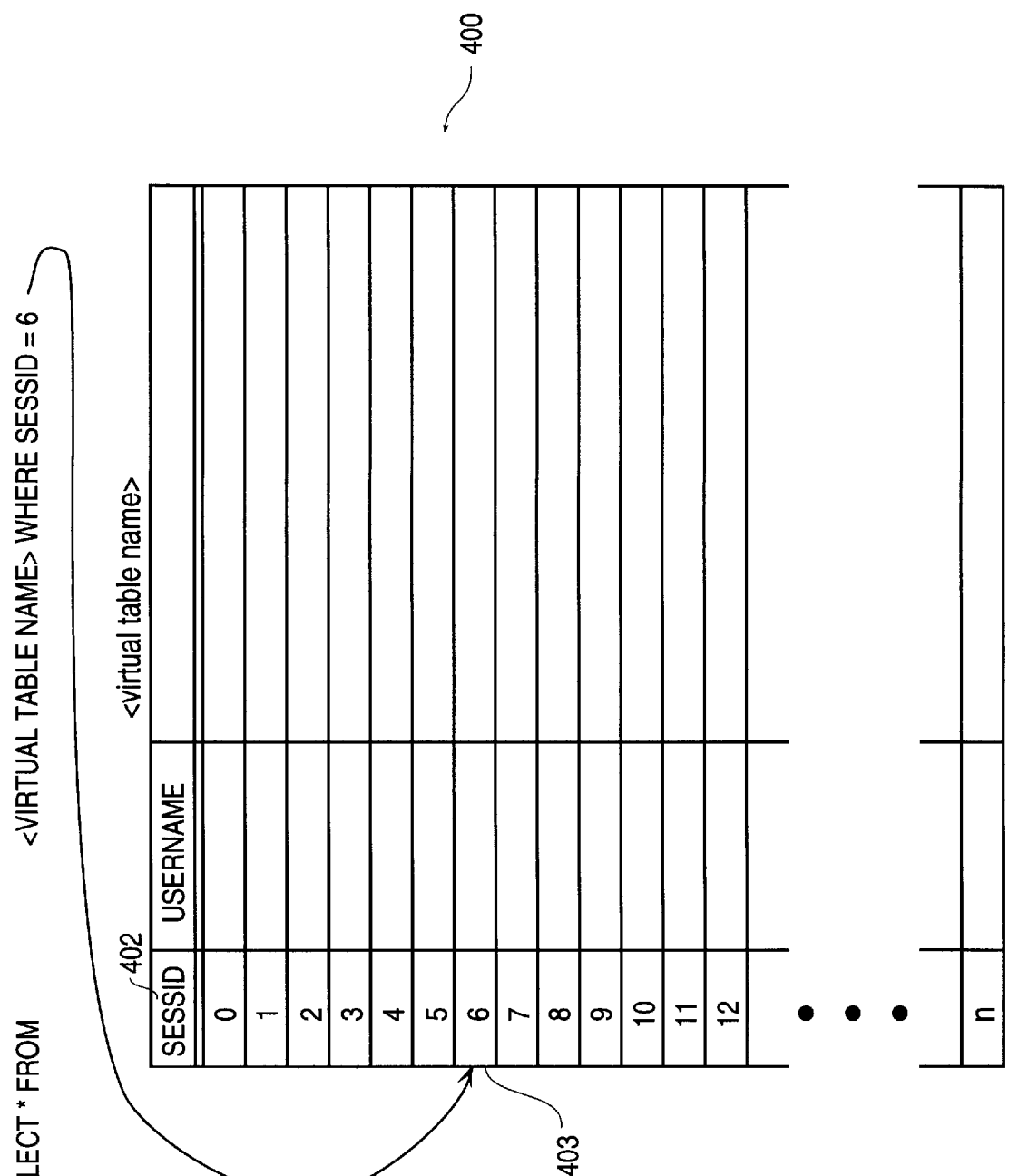
FIG. 4 is a diagram of a virtual table that may be accessed by an embodiment of the present invention.

As stated earlier, according to one approach, database management system software maintains a set of virtual tables that store information about current database activity. A virtual table can maintain information regarding, for example, current sessions, a specific session, an SQL statement, statistics for a session, locks, open cursors, etc. With reference to FIG. 4, a virtual table 400 is illustrated. The virtual table may be comprised of a number of rows and a number of columns. According to one embodiment of the invention, a mechanism for non-sequentially accessing information in virtual table 400 is provided. One or more columns may be a key column such that a user specifying a value in the key column (i.e., a key value) is able to directly access a particular row in the column having that value. For example, column 402 is a key column. If a user queries virtual table 400 without specifying a value in key column 402, the virtual table is accessed in a sequential manner beginning at the first row in the table and following through to the last row of the table, whether or not the particular row the user is seeking to find was indeed found.

However, according to one embodiment of the invention, if a user specifies a query in which a value in the key column is specified, the particular row in the key column within virtual table 400 having that value is directly accessed. For example, when a user issues query 401 specifying a session ID value of 6, the database management system directly accesses row 403 having a session ID value of 6 in the session ID column. The key value specified by the user in the SQL query statement is ultimately mapped to a memory address of row 403 in the data structure in memory. The method of mapping a key value to a unique memory address in the memory data structure comprising the virtual table depends on the type of memory structure utilized for storing the virtual table.

Figure 5:
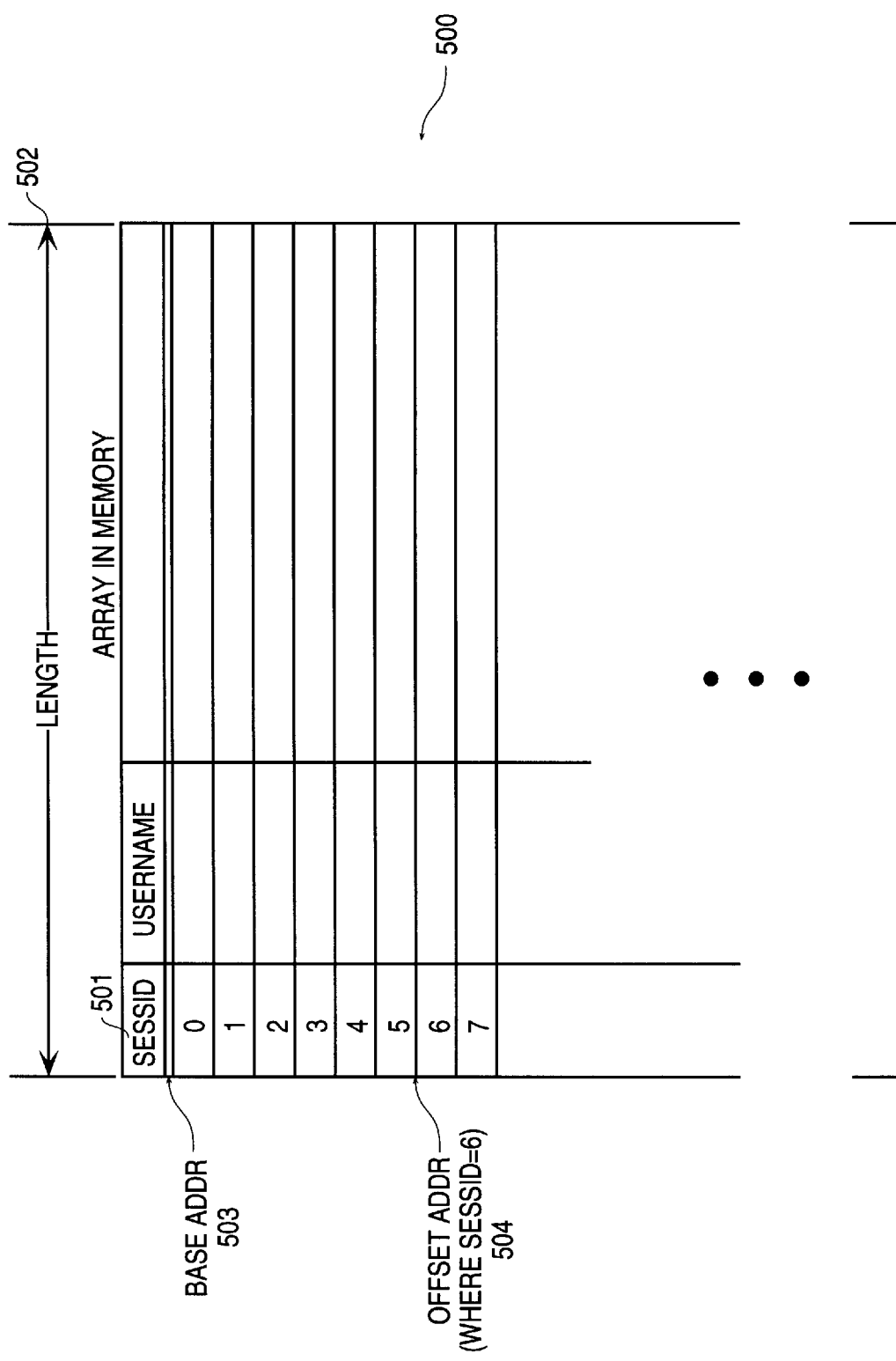
FIG. 5 illustrates an array data structure in memory that may be utilized to store the information in the virtual table.

For example, with reference to FIG. 5, an array data structure 500 in memory is illustrated. The array 500 may be used to store the information provided by a virtual table. Thus, a user may issue a query in which a value, i.e., a key value, is given in a database query language statement. A DBMS process locates the value in a corresponding key column logically and physically within the array 500. Having determined the row of the array 500 in which the key value is stored in the key column, the DBMS process then maps the value specified to a unique memory address in the array. The DBMS process then fetches the data in the row of the array having the value.

For instance, key column 501 of array 500 stores session ID values. If a user specifies a key value of 6 for a session ID, column 501 of array 500 is searched to locate the row in the array in which the key column has the session ID value of 6. An array mapping function is then performed, in which the memory address corresponding to the row is computed based on the base address 503 of the array, plus the length 502 of a row in the array 500 multiplied by the key value, in this case, 6.

With respect to FIG. 7, a virtual table may be stored in a hash table in memory. The value specified by the user in the SQL query statement, e.g., the session ID value, is used by a hashing function to compute a key value for direct, non-sequential access into the hash table. As can be seen in hash table 700, the rows are stored in a particular order in the memory structure according to the hashing function. It is convenient to consider the hash table to be an array of rows and to let the hashing function calculate, given a value specified by the user, the key value of a row in column 701 that may contain the desired information. The hashing function does not necessarily calculate the actual memory address of the row in which the specified value actually exists. Once the key value is computed by the hashing function given the specified value, a mapping function can complete the conversion of the key value into an actual memory address. The hashing function uses the specified value as a seed to determine the location of the desired information. If the specified value does not exist at that location, a collision has occurred. A collision occurs when two different specified values hash to the same location. Strategies for handling collisions, known as rehashing or collision-resolution strategies, are initiated upon the occurrence of a collision.

According to another embodiment of the invention, if a user specifies a query in which a value in a key column is specified, the virtual table is sequentially accessed only until a row in the key column within virtual table 400 having that value is accessed. The key value specified by the user is mapped to a memory address of the row 403 in the data structure in memory.

Figure 6:
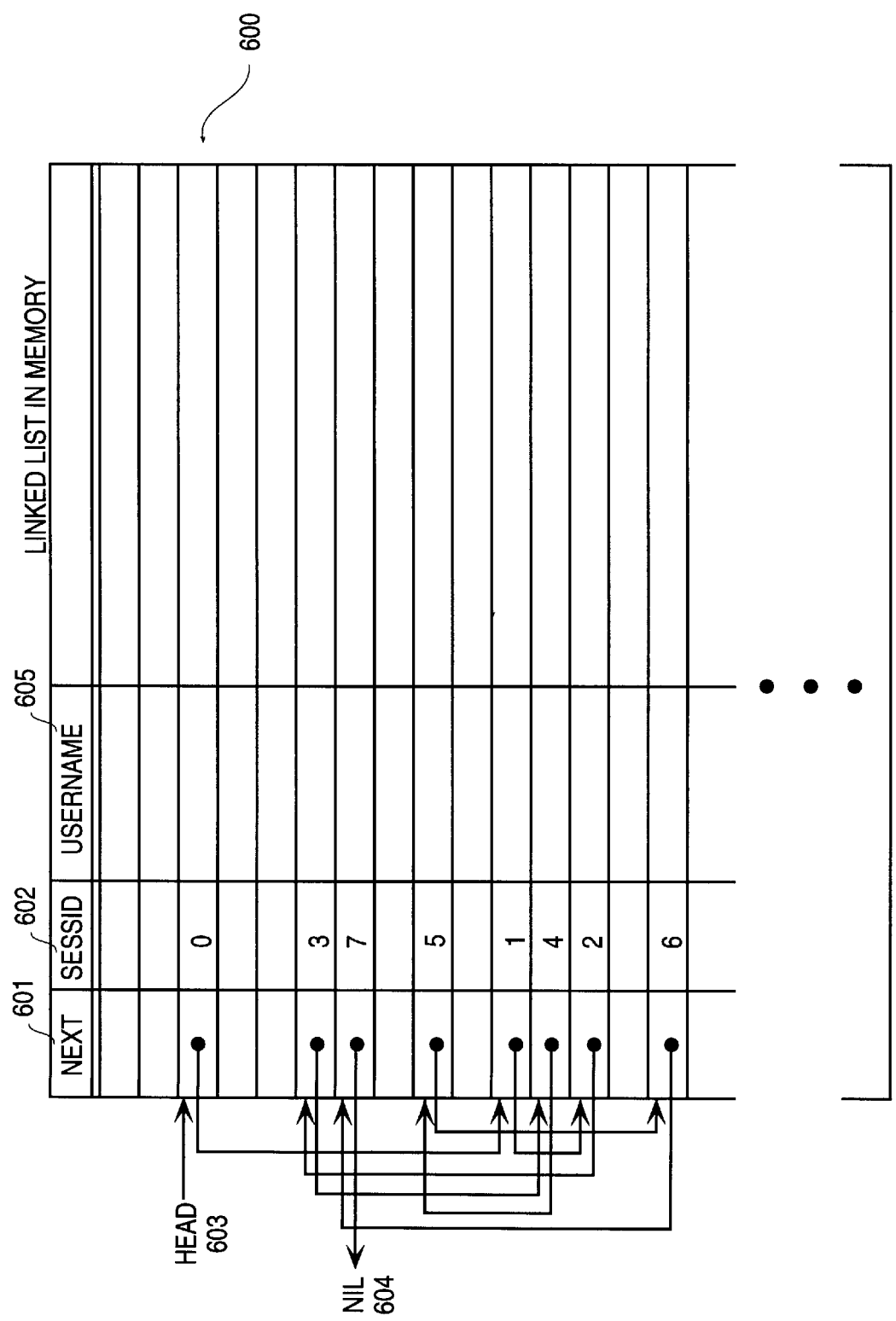
FIG. 6 illustrates a linked list data structure in memory that may be utilized to store a virtual table; and, FIG. 7 illustrates a hash table data structure in memory that may be utilized to store a virtual table.

With reference to FIG. 6, a linked list data structure 600 in memory is illustrated. A primary characteristic of the linked list data structure is that each row contains not only data, but also a pointer whose value indicates the memory address of a logically related row, e.g., the next logical row, previous logical row, or both, in the linked list data structure in memory. A column 601 contains the pointer values. Other columns contain data, such as session ID (in column 602) or user name (in column 605).

When a user specifies a key value, e.g., a session ID value, the linked list 600 is traversed from the head 603 of the linked list until the session ID value specified by the user is found in column 602 by following the pointers in column 601 whose contents specify the memory address of logically related rows. At that point, the search is completed and the DBMS process fetches the data from the linked list at the current row. If the session ID is not found, eventually the linked list is traversed until a row in the linked list having a pointer value of nil (604) is the current row, in which case a return code is returned to the user indicating that the session ID value was not found in the virtual table.

For the purposes of explanation, embodiments of the present invention have been described with respect to accessing information in a virtual table in memory. However, in alternative embodiments, the techniques described herein may be applied to numerous types of known data structures in memory, such as arrays of pointers, doubly-linked lists, etc. Thus, the present invention is not limited to any particular type of memory data structure or database management system environment.

In foregoing specification, the invention has been described with reference to specific embodiments. It will, however, be evident that various modifications may be made thereto without departing from the broader spirit and scope of the invention. The specification and drawings are, accordingly, to be regarded in an illustrative rather than a restrictive sense. The present invention is intended to be limited, therefore only by the claims presented below.

What is claimed is:

1. In a database management system, a computer implemented method of retrieving information from a virtual table in a memory of a computer system, comprising the steps of:
   a) monitoring current activity in said database management system;
   b) storing said information in said virtual table, said information indicating said current activity in said database management system;
   c) receiving a value corresponding to said information from a user process specifying said value in a database query language statement;
   d) determining a location of said information in said virtual table based on said value;
   e) mapping said location to a memory address in said memory at which said information is located;
   f) reading said information from said memory beginning at said memory address; and
   g) supplying said information to said user process in response to said database query language statement.

2. The computer implemented method of claim 1 wherein said step of monitoring current activity in said database management system includes monitoring current activity in a relational database management system.

3. The method of claim 1 wherein said step of receiving a value corresponding to said information from a user process specifying said value in a database query language statement includes receiving a value corresponding to said information from a user process specifying said value in a structured query language statement.

4. The method of claim 1 wherein said step of mapping said location to a memory address in said memory at which said information is located includes mapping said location to a memory address in a random access memory at which said information is located.

5. The method of claim 1 wherein said step of determining a location of said information in said virtual table based on said value includes determining said location of said information in an array based on said value.

6. The method of claim 5 wherein said step of mapping said location to said memory address in said memory at which said information is located includes performing an array mapping function using said value to determine said memory address.

7. The method of claim 6 wherein said step of performing an array mapping function includes multiplying said value by a length of said information, and adding the resulting sum to a base memory address of said array.

8. The method of claim 1 wherein said step of determining a location of said information in said virtual table based on said value includes determining said location of said information in a linked list based on said value.

9. The method of claim 8 wherein said step of mapping said location to said memory address in said memory at which said information is located includes the step of using a pointer value pointing to said location as said memory address in said memory at which said information is located.

10. The method of claim 1 wherein the step of determining a location of said information in said virtual table based on said value includes determining a key value for said information in a hash table based on said value.

11. The method of claim 10 wherein the step of mapping said location to a memory address in said memory at which said information is located includes performing a mapping function using said key value to determine said memory address.

12. A database management system for retrieving information from a virtual table in a memory of a computer system, the database management system comprising:
   a) means for monitoring current activity in said database management system;
   b) means for storing said information in said virtual table, said information indicating said current activity in said database management system;
   c) means for receiving a value corresponding to said information from a user process specifying said value in a database query language statement;
   d) means for determining a location of said information in said virtual table based on said value;
   e) means for mapping said location to a memory address in said memory at which said information is located;
   f) means for reading said information from said memory beginning at said memory address; and
   g) means for supplying said information to said user process in response to said database query language statement.

13. The database management system of claim 12 wherein said means for monitoring current activity in said database management system includes means for monitoring current activity in a relational database management system.

14. The database management system of claim 12, wherein said means for receiving a value corresponding to said information from a user process specifying said value in a database query language statement includes means for receiving a value corresponding to said information from a user process specifying said value in a structured query language statement.

15. The database management system of claim 12 wherein said means for mapping said location to a memory address in said memory at which said information is located includes means for mapping said location to a memory address in a random access memory at which said information is located.

16. The database management system of claim 12 wherein said means for determining a location of said information in said virtual table based on said value includes means for determining said location of said information in an array based on said value.

17. The database management system of claim 16 wherein said means for mapping said location to said memory address in said memory at which said information is located includes means for performing an array mapping function using said value to determine said memory address.

18. The database management system of claim 17 wherein said means for performing an array mapping function includes means for multiplying said value by a length of said information, and means for adding the resulting sum to a base memory address of said array.

19. The database management system of claim 12 wherein said means for determining a location of said information in said virtual table based on said value includes means for determining said location of said information in a linked list based on said value.

20. The database management system of claim 19 wherein said means for mapping said location to said memory address in said memory at which said information is located includes pointer means for pointing to said location as said memory address in said memory at which said information is located.

21. The database management system of claim 12 wherein said means for determining a location of said information in said virtual table based on said value includes means for determining a key value for said information in a hash table based on said value.

22. The database management system of claim 21 wherein said means for mapping said location to a memory address in said memory at which said information is located includes means for performing a mapping function using said key value to determine said memory address.

* * * * *

UNITED STATES PATENT AND TRADEMARK OFFICE
CERTIFICATE OF CORRECTION

| | | |
|---|---|---|
| PATENT NO. | : | 5,809,495 |
| DATED | : | September 15, 1998 |
| INVENTOR(S) | : | Juan R. Loaiza |

It is certified that error appears in the above-identified patent and that said Letters Patent is hereby corrected as shown below:

On the title page, item [54] and Col. 1, line 4,
        delete "VIRITUAL" and insert --VIRTUAL--

Signed and Sealed this

Fifteenth Day of December, 1998

*Attest:*

BRUCE LEHMAN

*Attesting Officer*    *Commissioner of Patents and Trademarks*